Figure 1:
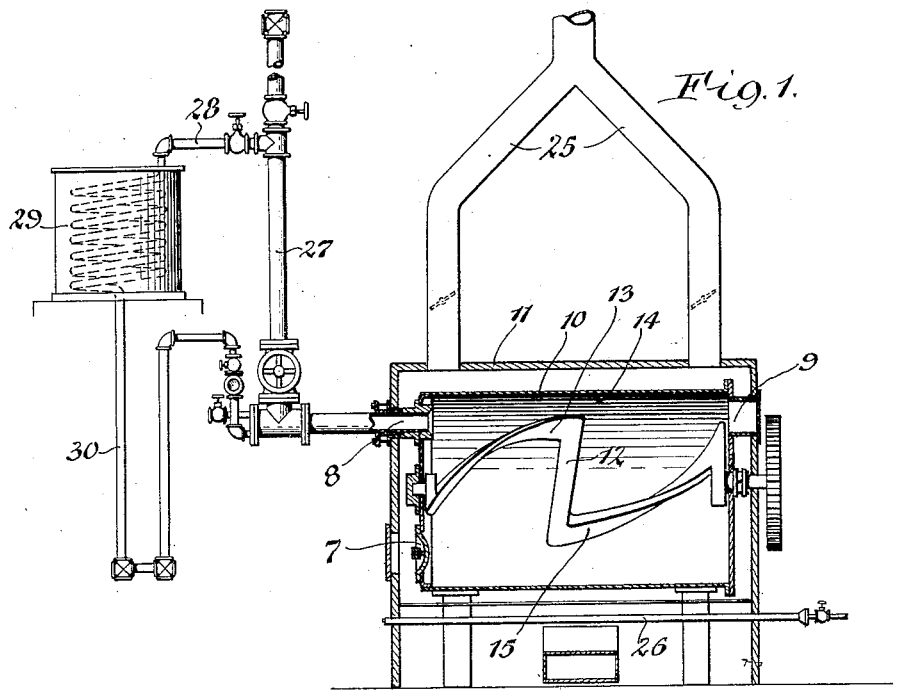

June 14, 1932.    J. M. F. LEAPER ET AL    1,862,575
PROCESS OF MAKING SULPHUR DYES
Filed Nov. 15, 1926

Inventor
J. M. F. LEAPER.
R. W. HESS.
by William J. Narslake
Attorney

Patented June 14, 1932

1,862,575

UNITED STATES PATENT OFFICE

JOSEPH M. F. LEAPER AND RAYMOND W. HESS, OF BUFFALO, NEW YORK, ASSIGNORS TO NATIONAL ANILINE & CHEMICAL COMPANY, INC., OF NEW YORK, N. Y., A CORPORATION OF NEW YORK

PROCESS OF MAKING SULPHUR DYES

Application filed November 15, 1926. Serial No. 148,398.

This invention relates to processes for the manufacture of sulphur dyes and similar substances which require fusion of reagents and become viscous during the progress of the reaction.

Sulphur dye processes, to which this invention is more specifically directed, ordinarily involve two distinct steps as commonly practiced, namely, a fusion of an organic substance with a sulphurizing agent such as, for example, sulphur or an alkaline polysulfide, and a treatment of the melt with an inert suitable solvent or with a reagent necessary for the completion of the formation of the dyestuff. The second step is sometimes omitted, especially when the fusion is carried out under alkaline conditions, but improved results usually attend its use.

In the early stages of a sulphur dye fusion step there is ordinarily an evolution of hydrogen sulfide accompanied by considerable foaming. As the fusion proceeds, the melt becomes viscous and intumescent. Finally, intumescence ceases and the mass, in some cases, hardens to a brittle and more or less porous solid, and in other cases remains as a tough viscous mass. Slight changes in the temperature, particularly the final temperature to which the mass is heated, have decided effects on the properties of the dyestuff produced; but the extremely low thermal conductivity of the reaction mass coupled with its great tenacity in the viscous and intumescent stage offer great difficulty in controlling the temperature and securing a homogeneous condition. Accordingly, a procedure heretofore developed in the art consists in heating a charge that is small in comparison to the size of the container, agitating to homogeneity until the viscous condition is approached, and then pouring into shallow trays to avoid local overheating and to obtain a more uniform heating. Evidently the heating in the container becomes non-uniform as the mass reaches the viscous state, and homogeneity is sacrificed by omitting the agitation during the heating period in the trays. As a consequence it has been found in practice that the products vary considerably in their dyeing properties not only when prepared in different kettles but even with succeeding batches from the same kettle.

The second step of treating the melt with a suitable solvent or reagent requires access of the solvent or reagent to all portions and, particularly in connection with sulphur fusions, usually requires prolonged heating. Therefore, under the customary practice, the cooled mass is broken up and again placed in a heated container, under a reflux, to which the solvent or reagent is added. After the melt has gone into solution, it is cooled and the dyestuff precipitated therefrom in any suitable manner.

According to the present invention, a uniform heating and substantial homogeneity of the reaction mass is made possible during the whole of the fusion period and duplication of the conditions of operation and of the resulting product is permitted. The invention also secures a reduction in the lag in heat transfer with a consequent lowering of the jacket temperature required. It further contemplates a distinct advance over the known practice in combining the step of dissolving or treating the melt with the preceding fusion step by carrying out both steps in situ, that is, in a single piece of apparatus. In addition it provides a treatment which is adapted to minimize the occurrence of foaming and diminish the amount of intumescence.

Briefly stated, the process of the present invention consists in carrying out the whole of the fusion step, without substantial loss in homogeneity or local overheating, in a unitary means under a continuous agitation, so that there is a presentation of fresh surfaces of the charge to a heated wall and a distribution that results in a substantially uniform heating during all stages, including the viscous and the solid. After cooling, the solid or solidified mass can be removed; but preferably the melt is ground in the vessel. A suitable solvent or reagent, such as a solution of caustic soda or of sodium sulphide, or in some cases water alone or other solvent, is added to the melt in situ, that is, in the same vessel, and a regulated heat is again applied until the melt passes into solution. The solution so formed may be withdrawn for precipitation of the dyestuff therefrom or it may be precipitated in situ. The dyestuff may be isolated or precipitated from the solution in any suitable manner. For example, it may be salted out, or it may be precipitated by acidification or neutralization, or by a current of air of carbon dioxide, and the whole evaporated to dryness or the precipitate filtered off, as desired.

The invention will be further described in connection with the accompanying drawing illustrating apparatus adapted for the practice of the invention.

The apparatus includes either a stationary or a rotating vessel suitably equipped with agitating means. Each type is disclosed in the accompanying drawing in which Fig. 1 is a vertical section of a stationary form and Fig. 2 is a vertical section of a rotating form.

The stationary form of reactor or thionator, as illustrated in Fig. 1, comprises a stationary horizontal drum 10 enclosed within a heating jacket 11 and provided with the end opening 9 for charging material to the drum, the end opening 7 for discharging material from the drum, and the end opening 8 for the escape of gases and vapors given off during the reaction. The drum is further provided with a Z bar agitator 12, one section 13 of which scrapes the wall 14 and causes axial movement of the material in one direction, and the other offset section 15 of which scrapes the remaining wall portion and moves the material axially in the opposite direction. With an agitator arrangement that forces the charge toward the middle, in conjunction with an end outlet, foaming and intumescence of the charge is obviated to a considerable extent. Reference numbers 25 to 30 inclusive, designate parts which correspond with, and are for the same purpose as, similarly designated parts of Figure 2, which are described below in connection with that figure.

Figure 2:
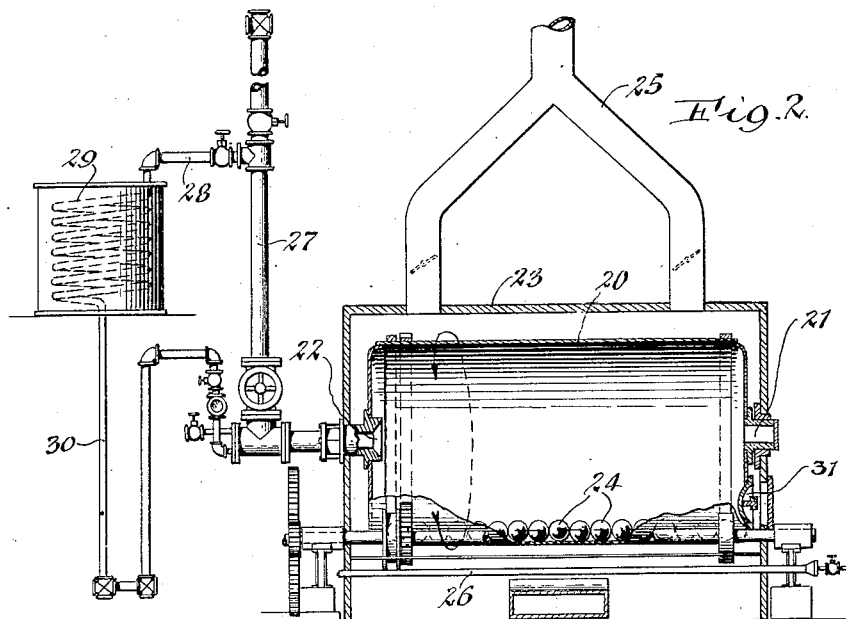

A suitable thionator of the second or rotating type as disclosed in Fig. 2, consists of a rotating drum 20 with axial openings 21, 22 for charging material and for the escape of gases and vapors given off during the reaction, respectively, and the opening 31 for discharging material from the drum. The drum is preferably inclosed within a housing 23 for heating but it may be jacketed for this purpose. As an agitating means, a plurality of rows of cast iron balls 24 of suitable size are shown; but other suitable devices such as jack-stones, S-bars or chains can be substituted therefor or used in conjunction therewith. A vent 25 is provided to carry off gases generated by gas burners 26; other heating means, however, may be substituted. A vented and valve-controlled pipe line 27 leads from the gas escape opening 22 in the drum, and a branch line 28 therefrom is connected to a condenser 29 from which a condensate line 30 leads back to the drum.

With the second type of apparatus the drum is charged through the opening 21 with the reacting materials either prior to heating and rotating the drum or after the drum has been brought to a desired temperature; the charge can be fed as a whole or in portions over a period of time. Heat is applied to fuse the material and the mass is agitated and thoroughly homogenized during the fusion period by the lifting or tumbling action of the rotating wall and the movement of the balls or other agitating means. Foaming in the early stages and intumescence in later stages is prevented or minimized by the loose balls rolling upon, impacting and kneading the mass as gas is evolved and thus releasing entrained gas. As the mass becomes viscous, it is spread upon the rotating wall of the thionator in a substantially uniform, relatively thin layer by the rotation of the vessel supplemented by the pounding of the agitating means; the comparative thinness of the layer so formed offers relatively small resistance to the transfer of heat and permits a lower temperature of the heating gases and substantial equality in the amount of heat transferred to the various portions of the charge thereby providing for the heating of the mass with substantial uniformity as it approaches hardness. When the fusion is finished, the drum is cooled, preferably by a blast of air. The rotation of the drum can be continued, in which case the balls rolling over the hardened melt break it up and grind or crush it for the following step of solution; the balls further can assist in bringing the melt into solution after the addition of the solvent. Condensate from the reflux can be returned while the melt is being heated during the solution step to maintain a desired dilution; or the solution can be heated to a concentrated condition and thereafter diluted for withdrawal and precipitation.

In order that the invention may be fully disclosed, specific applications of fusions of organic substances with sulphur or a polysulphide follow. It is to be understood, however, that the invention is not restricted to the organic substances specified but other substances capable of yielding sulphur dyes, or mixtures of these substances, may be substituted.

It is also evident that the invention is not limited to sulphur fusions but is applicable to processes that involve other reagents and display similar physical characteristics.

*Example 1.*—About 28 parts by weight of metatolylenediamine crystals and 87 parts of sulphur are fed into the reactor or thionator provided with agitating means, and it is thereupon heated at a uniform rate until a temperature of 250° C. is reached. During this period there is considerable evolution of gas and foaming, and the mass becomes viscous and intumesces as explained above. It is held at this temperature for about an hour, or until a suitable product results, and then cooled to about 110° C. About 130 parts of caustic soda liquor (48° Bé.) is added to the melt in the thionator, and the mixture is boiled under a reflux for about 6 hours. The contents are thereupon blown into water in a vat to which just enough dilute sulphuric acid is added to precipitate the dye product which is thereupon filtered and dried. The product so produced dyes cotton in an alkaline bath a bright shade of orange brown.

In the above example, instead of blowing the contents of the thionator to a vat containing a diluted sulphuric acid, sulphuric acid may be added directly to the charge in the thionator and the precipitated dye then either filtered off and dried or the mixture as a whole may be evaporated to dryness in the thionator and the dyestuff thus recovered.

*Example 2.*—A dinitro compound, such as 2:4-dinitrotoluene, $C_6H_3(CH_3)(NO_2)_2$, is added to an aqueous solution of a polysulphide of the approximate formula $Na_2S_6$ in the proportions of 1 mol. of the former to about 3 mols. of the latter. This addition takes place in the rotary thionator which is at a temperature of about 110° C. As the thionator is rotated, the temperature is gradually raised to about 250° C. and held there for about 2 hours while the mass is dried and baked. After cooling to about 110° C. sodium hydroxide liquor and water are added to the thionator in sufficient amount to dissolve the melt, the reflux is connected in, and the temperature raised to about 125° C. The solution is treated and the dyestuff recovered as before. This dyestuff gives a somewhat duller shade than the one above.

What is claimed is:

1. In a fusion process of reacting materials, wherein the reaction mass passes through viscous and intumescent stages, the improvement which comprises heating said reaction mass in a rotary ball mill.

2. In the manufacture of a sulphur dye by a process including fusing an organic substance with a sulphurizing agent, the improvement which comprises heating the organic substance with the sulphurizing agent in a rotating ball mill.

3. In the manufacture of a sulphur dye by a process including fusing an organic substance with a sulphurizing agent, the improvements which comprise charging a reaction mixture containing said substances into a rotary ball mill, rotating said mill while heating said mixture at a reaction temperature, cooling the resulting reaction mass to harden it, and rotating the mill to grind the hardened mass.

4. In the manufacture of a sulphur dye by a process including fusing an organic substance with a sulphurizing agent, the improvements which comprise charging the organic substance and a sulphurizing agent into a rotary ball mill, heating the reaction mixture, and agitating it during its viscous and intumescent stages by rotating said mill, and heating the resulting melt in situ until the desired reaction is complete.

5. In the manufacture of a sulphur dye by a process including fusing an organic substance with sulphur, the improvement which comprises heating the organic substance with sulphur in a rotating ball mill until intumescence ceases.

6. In the manufacture of a sulphur dye by a process including fusing an organic substance with sulphur, the improvement which comprises introducing the organic substance and sulphur into a rotary ball mill, heating the mixture to a reaction temperature while rotating said mill, continuing said heating and rotation until the desired reaction has been completed, then cooling said mixture and then continuing said rotation to grind the hardened mass.

7. In the manufacture of a sulphur dye by a process including fusing an organic substance with sulphur, the improvement which comprises introducing the organic substance and sulphur into a rotary ball mill, heating the mixture to a reaction temperature while rotating said mill, continuing said heating and rotation until the desired reaction is completed, then cooling said mixture and continuing said rotation to grind the hardened mass, introducing a solvent ingredient into said mill, and heating the resulting mixture while continuing said rotation, to form a solution of the resulting dyestuff.

8. In the production of a sulphur dye by a fusion process which comprises heating metatolylenediamine with sulphur, the improvement which comprises subjecting the reaction mixture, during the course of the fusion, to combined mixing, impacting and kneading operations of the type produced by a rotary ball mill.

9. A method of producing a sulphur dye which comprises heating a reaction mixture containing about 28 parts of metatolylenediamine and about 87 parts of sulphur at a temperature approximating 250° C., while agitating the mixture by subjecting it to impacting, kneading and spreading operations of the type produced by a rotary ball mill until the fusion is substantially complete, cooling the resulting melt to about 110° C. while continuing said agitation, adding about 130 parts of 48° Bé. aqueous caustic soda solution to the cooled melt, boiling the mixture under reflux conditions while continuing said agitation, and separating the dye product.

10. In the manufacture of a sulphur dye by a process including fusing an organic substance with a sulphurizing agent, the improvement which comprises charging the organic substance and the sulphurizing agent into a reaction vessel of the rotary ball mill type, and rotating said vessel while applying heat thereto.

11. In the manufacture of a sulphur dye by a process including fusing a reaction mass containing an organic substance and a sulphurizing agent, and baking the fused mass, the improvement which comprises rotating about a substantially horizontal axis a reaction vessel containing the reaction mass while heating the vessel, to spread the mass in a relatively thin layer upon the inner wall of the vessel, and then heating the vessel with substantial uniformity while rotating it to bake the spread mass.

12. In the manufacture of a sulphur dye by a process including fusing a reaction mass containing an organic substance and a sulphurizing agent, baking the fused mass, and grinding the resulting product, the improvement which comprises carrying out the process in a reaction vessel rotating about a horizontal axis, and, during the course of the process, subjecting the mass to the action of loose, tumbling agitators.

In testimony whereof we affix our signatures.

JOSEPH M. F. LEAPER.
RAYMOND W. HESS.